US012762483B2

(12) United States Patent
Geist et al.

(10) Patent No.: US 12,762,483 B2
(45) Date of Patent: Oct. 13, 2026

(54) SYSTEMS AND METHODS FOR INTEGRATED ORCHESTRATION OF MACHINE LEARNING OPERATIONS

(71) Applicant: RPS Canada Inc., Toronto (CA)

(72) Inventors: Joshua Geist, Toronto (CA); Matthew Goddard, Toronto (CA)

(73) Assignee: RPS Canada Inc., Toronto (CA)

( * ) Notice: Subject to any disclaimer, the term of this patent is extended or adjusted under 35 U.S.C. 154(b) by 1057 days.

(21) Appl. No.: 17/950,871

(22) Filed: Sep. 22, 2022

(65) Prior Publication Data

US 2023/0094742 A1 Mar. 30, 2023

Related U.S. Application Data

(60) Provisional application No. 63/247,226, filed on Sep. 22, 2021.

(51) Int. Cl.
*G06F 9/50* (2006.01)
*G06F 9/48* (2006.01)
*G06N 20/20* (2019.01)

(52) U.S. Cl.
CPC ........... *G06N 20/20* (2019.01); *G06F 9/4881* (2013.01)

(58) Field of Classification Search
CPC ...... G06N 20/20; G06N 20/00; G06F 9/4881; G06F 9/541
See application file for complete search history.

(56) References Cited

U.S. PATENT DOCUMENTS

| | | | | |
|---|---|---|---|---|
| 11,443,102 | B1 * | 9/2022 | Wilson | G06Q 30/04 |
| 11,861,423 | B1 * | 1/2024 | Potyraj | G06F 9/3877 |
| 12,387,132 | B1 * | 8/2025 | Tong | G06F 16/9024 |

(Continued)

FOREIGN PATENT DOCUMENTS

EP 3376361 A2 * 9/2018 ........... G06F 3/0647

OTHER PUBLICATIONS

Androcec, Darko, and Andrea Tikvica. "Interoperability of Machine Learning Services: a Use Case." Economic and Social Development: Book of Proceedings (2019): 106-113. * pp. 108-110; figs. 1 and 2; tables 7 and 8*.

(Continued)

*Primary Examiner* — Hassan Mrabi
(74) *Attorney, Agent, or Firm* — Foley & Lardner LLP

(57) ABSTRACT

Disclosed herein are systems and methods for managing and deploying pre-trained machine-learning (ML) models from disparate third-party systems and a host system. An orchestration system selects effective pre-trained ML models to suit a client user's business operation demands and data analysis requirements. A model orchestration engine accesses and maintains a model orchestration database containing a catalogue of ML models. The catalog indicates, for example, the capabilities, data inputs, and data outputs of each ML model. The orchestration engine builds an execution pipeline of certain ML models according to a client request for an operation or function and the client data submitted from a client device. The orchestration server can format or normalize the client data or output data received from the client device or an earlier model according to a data specification, thereby generating input data for subsequent models in the pipeline.

20 Claims, 4 Drawing Sheets

(56) References Cited

U.S. PATENT DOCUMENTS

| | | | | |
|---|---|---|---|---|
| 12,517,685 | B2 * | 1/2026 | Gold | G06F 3/0679 |
| 2019/0121673 | A1 * | 4/2019 | Gold | G06F 3/067 |
| 2019/0236485 | A1 * | 8/2019 | Stanley, III | H04L 67/303 |
| 2019/0318240 | A1 * | 10/2019 | Kulkarni | G06F 9/5044 |
| 2020/0074515 | A1 | 3/2020 | Ghatage et al. | |
| 2020/0167437 | A1 * | 5/2020 | Mallya Kasaragod | G06F 30/27 |
| 2020/0250525 | A1 * | 8/2020 | Kumar Addepalli | G06N 3/063 |
| 2020/0272947 | A1 * | 8/2020 | Carullo | G06F 16/355 |
| 2021/0012047 | A1 * | 1/2021 | Nendorf | G06F 9/46 |
| 2021/0271802 | A1 * | 9/2021 | Kramer | G06N 3/08 |
| 2021/0357256 | A1 * | 11/2021 | Cao | G06F 11/3409 |
| 2021/0392146 | A1 * | 12/2021 | Lin | G06F 21/552 |
| 2022/0172078 | A1 * | 6/2022 | Trim | H04W 24/02 |
| 2022/0318685 | A1 * | 10/2022 | Sivakumar | G06N 20/00 |
| 2022/0345353 | A1 * | 10/2022 | Sivakumar | H04L 41/0213 |
| 2023/0049167 | A1 * | 2/2023 | Wilson | G06V 30/19107 |
| 2025/0184212 | A1 * | 6/2025 | Howard | A61P 25/28 |
| 2025/0384397 | A1 * | 12/2025 | Kullman | G06Q 10/10 |

OTHER PUBLICATIONS

ISR and Written Opinion on PCT Application PCT/CA2022/051399, Nov. 21, 2022 (9 pages).

International Preliminary Report on Patentability for PCT App. PCT/CA2022/051399 dated Mar. 26, 2024 (7 pages).

* cited by examiner

SYSTEMS AND METHODS FOR INTEGRATED ORCHESTRATION OF MACHINE LEARNING OPERATIONS

CROSS-REFERENCE TO RELATED APPLICATION

This application claims priority to U.S. Provisional Patent Application No. 63/247,226, filed Sep. 22, 2021, which is incorporated by reference in its entirety.

TECHNICAL FIELD

This application generally relates to systems and methods for intelligently selecting, training, and deploying artificial intelligence (AI) programs from disparate sources.

BACKGROUND

Software developers and service providers develop and offer various types of machine-learning (ML) models and related software operations that are accessible to external software developers or other entities who desire to employ the ML model to perform certain functions. The ML models are often pre-trained prior to publication, which is beneficial to the external users who may not have the resources (e.g., databases, time, computing power) to generate adequate ML models. The external users can access these external-facing ML models directly by, for example, accessing a webpage of the ML model or downloading the ML model. The external users could also access the ML model through various types of calls (e.g., APIs, JSON) over the Internet. The external users can then employ the ML model for personal purposes or integrate the ML model into a consumer-facing service. However, a drawback is that some service providers may not offer ML models capable of particular functions or certain service providers publish comparatively better ML models than others, which might require the external user to access ML models from multiple service providers.

Like many types of software services, the ML models and related software programs operate according to disparate data specifications that vary by the particular publishers and/or functionalities. Each ML model is programmed to ingest input data and generate output data according to disparate data specifications defining the types of data and data formats expected or generated by each particular ML model. The data specifications for each of the ML models are not yet standardized. Another drawback is that the lack of standardization makes it challenging for downstream developers or users to move data from one ML model to another ML model. As a result, data outputs must be normalized in time-consuming processes before feeding the data output into the next ML model.

SUMMARY

Disclosed herein are systems and methods for managing and deploying pre-trained ML models from disparate third-party systems and a host system. An orchestration system selects effective pre-trained ML models to suit a client user's business operation demands and data analysis requirements. A model orchestration engine accesses and maintains a model orchestration database containing a catalogue database of ML models. The catalog indicates, for example, the capabilities, data inputs, and data outputs of each ML model. The orchestration engine builds an execution pipeline of certain ML models according to a client request for an operation or function and the client data submitted from a client device. The orchestration server can format or normalize the client data or output data received from the client device or an earlier model according to a data specification, thereby generating input data for subsequent models in the pipeline.

In an embodiment, a computer-implemented method comprises receiving, by a computer, from a client device a request for an operation using client data; generating, by the computer, an execution pipeline having a plurality of machine learning models hosted on a plurality of host servers, each machine learning model of the execution pipeline selected based upon the request and the client data; formatting, by the computer, the client data as input data for a first machine learning model of the plurality of machine learning models; and iteratively executing, by the computer, the plurality of machine learning models of the execution pipeline, comprising formatting output data from a preceding machine learning model for a subsequent machine learning model of the plurality of machine learning models.

In another embodiment, a system comprising a computer including a processor configured to: receive from a client device a request for an operation using client data; generate an execution pipeline having a plurality of machine learning models hosted on a plurality of host servers, each machine learning model of the execution pipeline selected based upon the request and the client data; format the client data as input data for a first machine learning model of the plurality of machine learning models; and iteratively execute the plurality of machine learning models of the execution pipeline, comprising formatting output data from a preceding machine learning model for a subsequent machine learning model of the plurality of machine learning models.

It is to be understood that both the foregoing general description and the following detailed description are exemplary and explanatory and are intended to provide further explanation of the invention as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
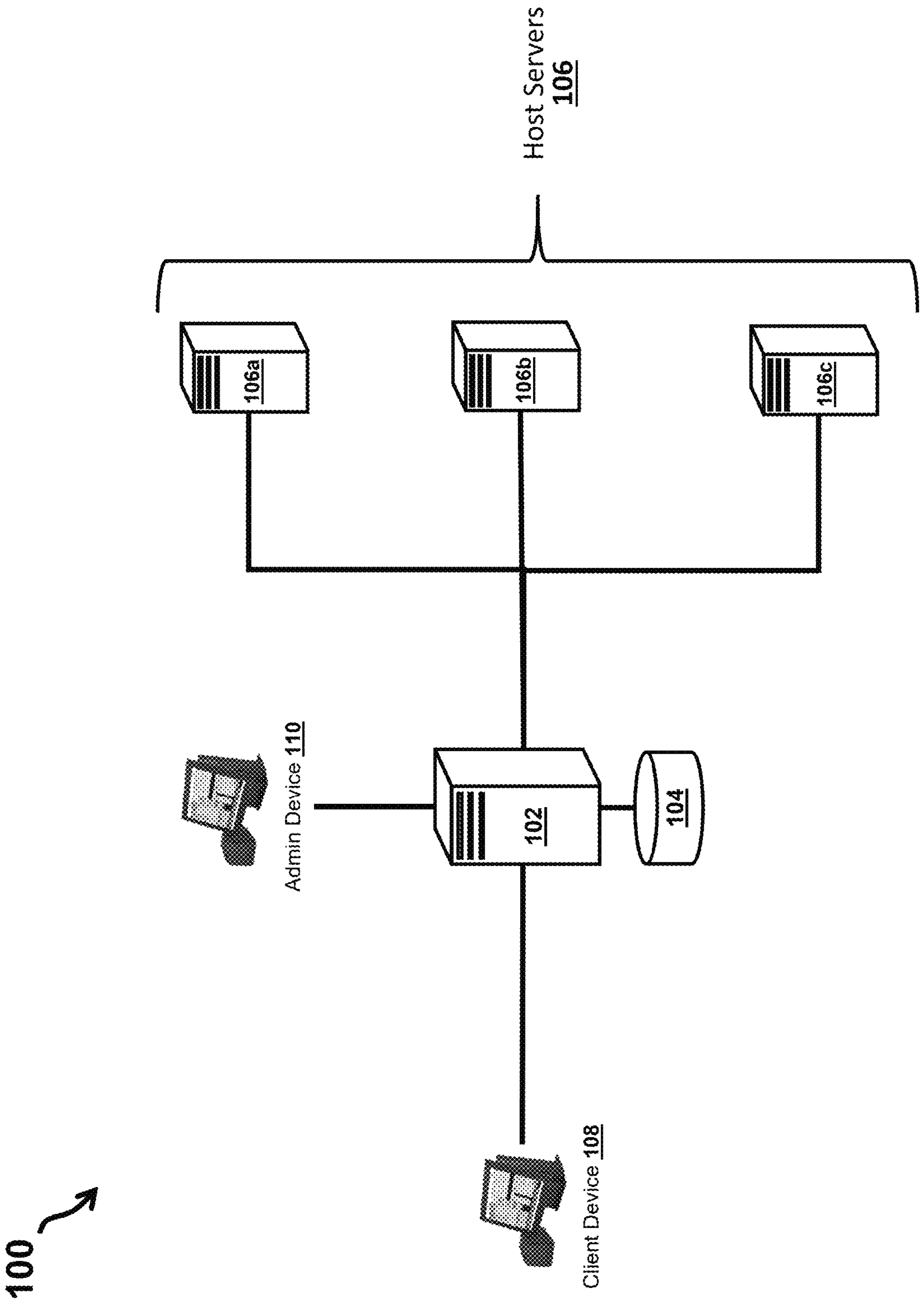
FIG. 1 shows components of a system for orchestrating execution of one or more machine-learning models according to an embodiment.

Reference will now be made to the illustrative embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

Disclosed herein are systems and methods for managing and deploying pre-trained machine-learning (ML) models from disparate third-party systems. An orchestration system selects effective pre-trained models to suit a client user's business operation demands and data analysis requirements. A model orchestration engine maintains a catalogue of available ML models that indicates the capabilities, data inputs, and data outputs of each ML model. The orchestration engine builds an execution pipeline of models according to the inputs received from the client device. An orchestration server that executes the orchestration engine exchanges input data and output data with the third-party host servers that host the selected ML models of the pipeline. In some cases, the orchestration server generates input data for the models of the pipeline by formatting or normalizing the client data received from the client device or output data received from a preceding machine learning model of the pipeline.

A client user may desire to utilize various ML models to perform a function or execute an algorithm. For example, the client user may wish to glean insights from video clips in video files (e.g., MPEG, MP4) by employing various ML models. The insights could include, for example, sentiment, unsafe content, objects, celebrity recognition, audio transcripts, language translations, and search terms, among others. The multiple ML models may be published by web services companies or infrastructures, such as Microsoft Azure®, Google®, IBM Watson®, and Amazon®. The ML models can be executed sequentially or in parallel to extract data from the video files and provide the desired information or generate the desired output. As an example, a first model could be applied on the video file to generate a transcription, and then a second model and a third model are applied on the transcription to generate a language translation and detect unsafe content. As another example, multiple models could be applied in parallel to the video file to identify sentiment, unsafe content, and objects in the video.

The orchestration server can determine which ML models are optimal for a given operation or function. In operation, the orchestration server feeds the same input file through multiple ML models and compares the output results, including quality of results and time required to generate the results. When generating the execution pipeline, the orchestration server identifies certain ML models that will produce more relevant results than others depending on the needs of the client user. A catalog stored in an orchestration database is updated with feature indicators, indicating particular features and relative strengths. The orchestration server identifies the most relevant models capable of, for example, obtaining a quality transcript of a video file with clear identification of speakers relating to individual sentences, extracting labels, and obtaining translations suitable for future closed captioning for hearing impairment. After the orchestration server identifies the strengths of each model, the orchestration server tailors the ML models of the pipeline to employ the most relevant ML models to accomplish all of the desired functions or outcomes.

Example System Components

FIG. 1 shows components of a system 100 for ML orchestration, according to an embodiment. The system 100 comprises an orchestration server 102, an orchestration database 104, ML servers 106, and client devices 108.

Orchestration Server 102 and Orchestration Database 104

The orchestration server 102 develops a set or pipeline of one or more ML models, based on inputs of a client request received from a client device 108. The orchestration server 102 may be any computing device comprising a processor and non-transitory machine-readable storage and capable of performing the various processes and tasks described herein. Non-limiting examples of the orchestration server 102 include desktop computers, laptop computers, server computers, and the like. The client request includes the client's desired function or outcome (e.g., transcribing audio of a video file), as well as additional information that the orchestration server 102 uses to develop and execute the pipeline. The request can further include, for example, operational instructions, parameters, starting format or file type, and/or destination format, among other types of instructions or parameters.

The orchestration server 102 queries an orchestration database 104 to identify the pre-trained ML models to include in the pipeline according to the client user's request. The orchestration database 104 is hosted on a computing device comprising non-transitory machine-readable storage, a processor, and software capable of maintaining a catalog of ML models and servicing the queries from the orchestration server 102. The data records of the orchestration database 104 contain information related to the ML models hosted by the third-party servers 106, such as the capabilities of the ML models, input data formats, output data formats, and the like. The data records may further include feature indicators or feature scores for each of the ML models of the catalog, identifying for the orchestration server 102 the capabilities of the ML models or the comparative effectiveness/efficiency for a certain function. The orchestration server 102 references the feature indicators when identifying the ML models capable of the desired functions and/or other operations.

In some embodiments, the orchestration server 102 executes a pipeline builder software program that includes a machine-learning architecture trained to select the ML models from the catalog of ML models to develop and establish the pipeline of ML models needed to service a user's request. To train the layers of the pipeline builder's machine-learning architecture, an administrative user operates the admin device 110 to transmit, feed, or otherwise submit various types of structured or unstructured training data to the orchestration server 102. At training time, the orchestration server 102 extracts or receives from the administrative user various types of features from the training data and applies the pipeline builder on the features to predict one or more ML models (or types of ML models) that could be applied to the training data. The training data includes, for example, various file formats, media-types, sample user instructions, and/or training labels indicating the expected results of applying the pipeline builder to the training data.

In some embodiments, the orchestration server 102 trains the pipeline builder for generating a relevance score, which indicates and classifies a likelihood that a particular ML model in the catalog is relevant to user-selectable functions or types of training data. The pipeline builder applies an ML model to the training data for training analysis, where the orchestration server 102 analyzes and trains one or more classifiers of the pipeline builder to satisfy one or more training thresholds and/or classification factors, which include types of data that the pipeline builder references for classifying the ML models as relevant to user-selected functions and selecting one or more of those particular ML models to build the ML pipeline. Non-limiting examples of classification factors include an ML model's accuracy, precision, and recall, among others. The accuracy factor indicates the proportion of correctly predicted classifications (e.g., proportion of correct predicted classifications over a total number of predicted classifications). The precision indicates the proportion of positive classification identifications that were correctly predicted (e.g., proportion of true positive classification identifications that were correctly predicted over the total number of true positive classifications and false positive classifications). Recall indicates the proportion of actual positives that were identified correctly (e.g., proportion of true positive classification identifications that were correctly predicted over the total number of true positive classifications and false negative classifications). During training time for the pipeline builder, the orchestration server 102 applies the machine-learning layers of the pipeline builder on various types of input training data and training labels. In training, the pipeline builder generates one or more predicted outputs, such as predicted relevance score or predicted functionality, for a given user-selectable function. The pipeline builder generates the predicted outputs and executes one or more loss functions using the training labels to determine and evaluate the accuracy of the pipeline builder. In some implementations, the loss functions may generate the various operational metrics (e.g., accuracy, precision, recall) of the pipeline builder to determine whether the pipeline builder is properly trained.

Moreover, in some implementations, during training time an administrative user or the pipeline builder may manually or automatically select and apply one or more ML models on the training data to perform the user-selectable function. By referencing training labels, loss functions may further generate the various operational metrics (e.g., accuracy, precision, recall) of the ML models to determine and evaluate which ML models are most relevant to particular types of inputs or user-selectable functions. For training, the ML model and/or the pipeline builder generate predicted outputs (e.g., predicted recognized object by an object recognition ML model; predicted relevance score for the ML calculated by the pipeline builder). The training labels associated with the training data may indicate the expected output of the ML model and/or the expected output of the pipeline builder. By referencing the training labels indicating expected outputs, the loss functions (or other functions) may adjust various hyper-parameters or weights of the ML model and/or the pipeline builder based upon a level of error between the predicted outputs and the expected outputs in the training labels.

At deployment time, the pipeline builder identifies and returns a selection of ML models to the client device 108 based upon the user request received at the orchestration server 102. The user request indicates, for example, one or more user-selected functions and various types of input data. The orchestration server 102 then applies the pipeline builder on the input data to generate a relevance score for the ML models in the catalog and select the comparatively best ML models having the best relevance score for each user-selected function requested by the user. The client device 108 presents the selected ML models proposed for the pipeline at the graphical user interface of the client device 108. The graphical user interface of the client device prompts the user to select or confirm one or more proposed ML models to include in the pipeline by entering user-selections into the graphical user interface of the client device 108.

In some circumstances, the orchestration server 102 performs various data normalization operations on the client data at deployment time or at various points in the pipeline. Each ML model includes the data specification indicating the data formatting expectations for the inputted data. As mentioned, the outputted data from one ML model may not satisfy the input data specification for the next model in the pipeline. The orchestration server 102 may execute certain data translation rules or execute a data translation model to translate the intended input data to a format that satisfies the data specification of the next model.

The orchestration database 104 is on any computing device accessible to the orchestration server 102 and capable of performing the various processes and tasks described herein, such as hosting the orchestration database 104 and performing various queries. In some cases, the orchestration server 102 hosts the orchestration database 104 and in other cases a distinct computing device in networked communication with the orchestration server 102 hosts the orchestration database 104. The orchestration database 104 stores and maintains the catalog of ML models. The orchestration database 104 responds to queries received from the orchestration server 102, among other devices, when the orchestration server 102 is developing the pipeline of models or when the orchestration server 102 performing various administrative tasks, such as updating the catalog to include new ML models.

The orchestration server 102 can execute webserver software (or communicate with a webserver hosted by another server) that hosts a web-based service allowing the client to interact with the functions and features of the orchestration server 102. The webserver receives the client request and related data from the client device 108 via a web browser of the client device 108.

Host Servers 106

The host servers 106 execute various ML models published by third-party entities. The host servers 106 include a computing device comprising a processor and software and are capable of the various processes and tasks described herein. Non-limiting examples of the host servers 106 include server computers, desktop computers, laptop computers, and the like. Each host server 106 exchanges input data and output data with the orchestration server 102, before and after executing the ML model of that particular host server 106. In operation the orchestration server 102 transmits the input data to the host server 106, which in turn ingests the input data, executes the particular model, and returns output data to the orchestration server 102. In some cases, the orchestration server 102 further provides various additional instructions or constraints to manage how the host server 106 executes the model.

The entity responsible for the host server 106 publishes or makes available the data specification for the particular model and any other requirements for calling the model. The orchestration database 104 stores this information in the data record for the model, informing the orchestration server 102 how to call the model and trigger execution by the host server 106. The host server 106 receives the input data from the orchestration data a particular forms or format according to the corresponding data record, where the forms or formats could include any number of data structures, file types, or data streams. The data specification can further indicate the expected data fields, data organization, and content expected when calling the model.

Client Device 108

The client device 108 allows the client user to access and interact with the orchestration server 102 via one or more networks. The client device 108 may be any computing device comprising a processor, non-transitory storage, and software (e.g., web browser) and is capable of performing the various processes and tasks described herein. Non-limiting examples of the client device 108 include desktop computers, laptop computers, tablets, mobile devices, server computers, and the like.

The client device 108 issues the client request, along with the various instructions and client data, to the orchestration server 102 according to inputs received from the client. The software of the client device 108 includes a user interface (GUI) allowing the client to enter or select the various instructions, parameters, and client data associated with the request. The client device 108 contains the client data in the storage medium or retrieves the client data from another device (not shown), which the client device 108 submits to the orchestration server 102 for formatting and submission to the host servers 106.

The orchestration server 102 can automatically identify the optimal models to employ in the pipeline and/or determine the optimal order for executing the models of the pipeline. Additionally or alternatively, the client user can use the GUI to select the models for the pipeline and/or the order of execution. In operation, the orchestration server 102 identifies adequate, available models in the catalog based on the request submitted from the client device 108. The orchestration server 102 presents a listing of the models to the client device 108 via the GUI, allowing the client user to enter the selections.

Admin Device 110

The admin device 110 allows a system admin user to interact with and configure the orchestration server 102 and orchestration database 104. The admin device 110 may be any computing device comprising a processor, non-transitory storage, and software (e.g., web browser) and is capable of performing the various processes and tasks described herein. Non-limiting examples of the admin device 110 include desktop computers, laptop computers, tablets, mobile devices, server computers, and the like. The admin device 110 includes a GUI allowing the admin user to enter configuration instructions via one or more networks.

The configurations include updates to the data records in the catalog. In some cases, the orchestration server 102 automatically detects and/or revises the data records of the orchestration database 104. And in some cases, the admin user can manually update the data requirements using the admin device 110. The changes can include, for example, entering new data records for new models, updating the formats or types of input data or output data for the models, and indicating the features or operations performed by the models, among other changes.

The configurations can also include updates to the data formatting operations of the orchestration server 102. As mentioned, the orchestration server 102 is configured to format various types of client data to generate input data for the particular models of the pipeline. Using the admin device 110, the admin user configures the orchestration server 102 and/or the data records of the orchestration database 104 to enter the formatting instructions. For instance, the formatting instructions for a particular model include a conversion mapping, which is software code that maps certain data fields or types of data of the client data to corresponding data fields or types of data in the expected input data. The admin user enters the formatting instructions according to the data specification of the particular model.

The configurations entered from the admin device 110 can include updates to the feature indicators in the data records. The feature indicators associated with the models indicate the capabilities of the models and, in some cases, include a feature score indicating the effectiveness/efficiency of the particular model. Although the orchestration server 102 may automatically determine the capabilities of the models or the feature scores of the models, the admin device 110 also allows the admin user to manually enter or adjust the values of the feature indicators through the GUI of the admin device 110.

Example Process Execution

Figure 2A:
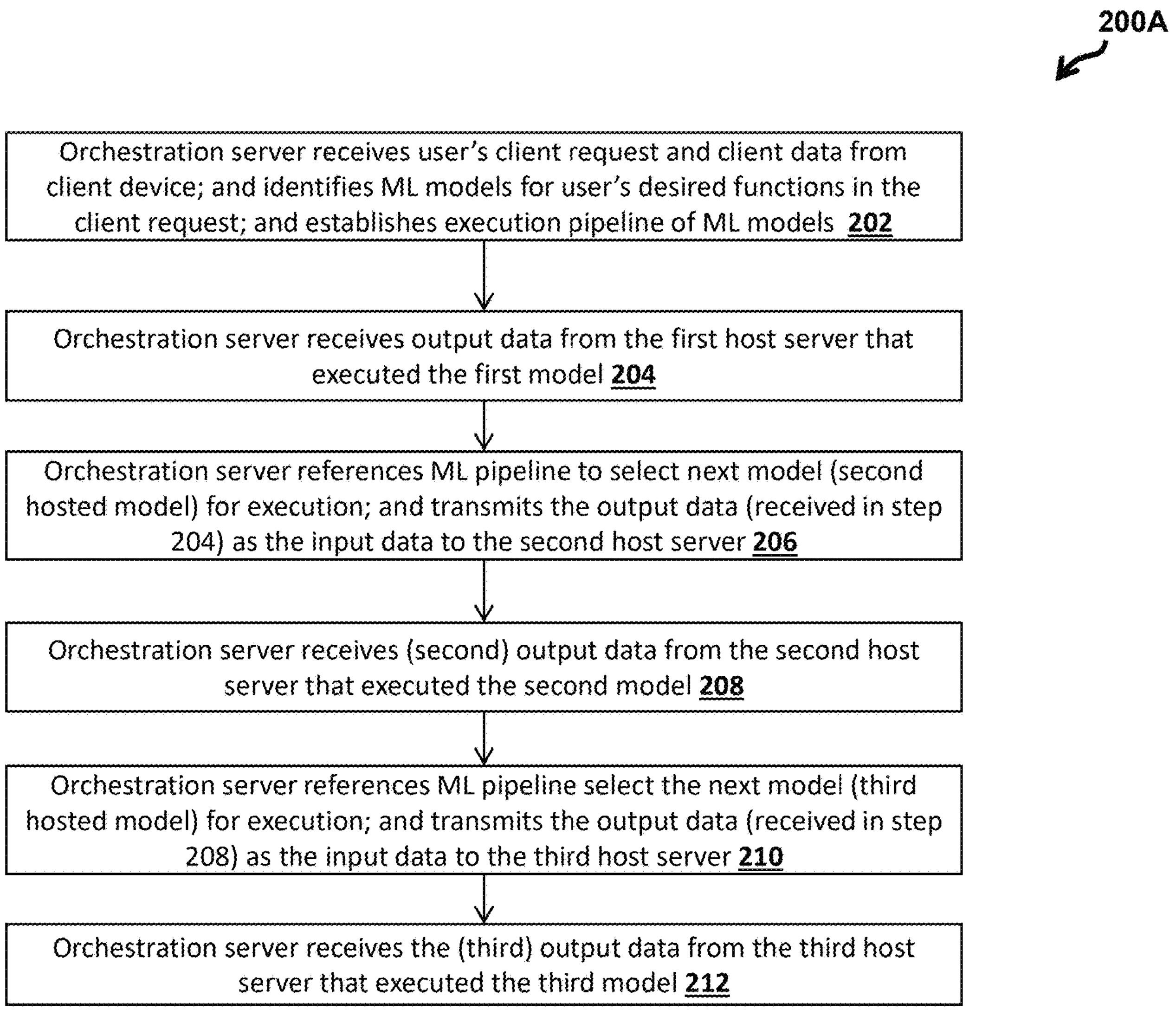
FIG. 2A shows execution steps of a process of developing an execution pipeline of one or more machine-learning models according to an embodiment.
Figure 2B:
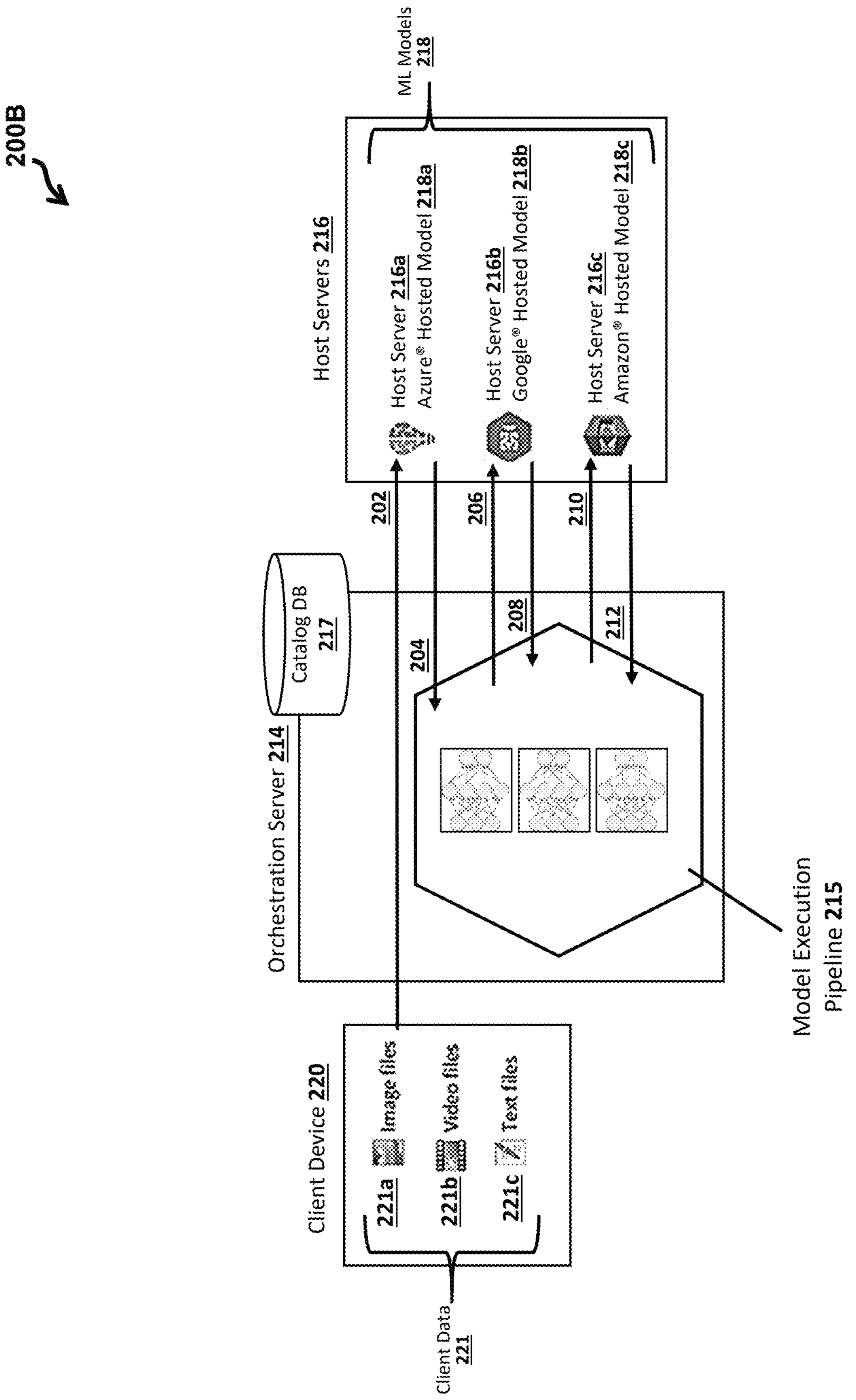
FIG. 2B shows data flow between devices of system for developing an execution pipeline of one or more machine-learning models according to an embodiment.

FIGS. 2A-2B show data flow between computing devices of a system 200B involved in an example process 200A for establishing an execution pipeline 215 of ML models 218*a*-218*c* (collectively referred to as "ML models 218" or an "ML model 218"), hosted by various host servers 216*a*-216*c* (collectively referred to as "host servers 216" or a "host server 216"), to provide a desired function or outcome on behalf of a client user. The orchestration server 214 executes various software operations (e.g., orchestration engine) that generate the execution pipeline 215 according to inputs from the client device 220. The inputs include, for example, a request for the desired function or outcome, instructions, parameters, and various types of files 221*a*-221*c* (referred to as "client data 221"). The orchestration server 214 selects the ML models 218 from a catalog database 217, which stores a catalog of models 218 in non-transitory memory, and assembles the pipeline 215 of ML models 218 that, when taken together, provide the client device 220 the desired function or outcome. The orchestration server 214 formats or normalizes the client data 221 to generate input data according to data specifications of the first model 218*a* of the pipeline 215. The orchestration server 214 then iteratively proceeds through the models 218 of the execution pipeline 215, where each iteration includes formatting input data and/or output data provide data to subsequent models 218*b*, 218*c* or to the client device 220. For instance, the orchestration server 214 receives the output data from the first host server 216*a* hosting the first model 218*a*, formats the output data for the second hosted model 218*b* in the pipeline 215 (thereby generating the input data for the second hosted model 218*b*), and transmits the input data to second host server 216*b* to execute the second hosted model 218*b*. The orchestration server 214 then presents the final output data to the client device 220, after the final model (e.g., third model 218*c*) of the pipeline 215 has executed.

Third-party entities publish and host the third-party ML models 218 on third-party host servers 216 that are accessible to the orchestration server 214 via one or more networks. The entities may be commercial software developers or cloud service providers, universities, governmental entities, or other types of organizations. As shown in FIG. 2, the models 218 include a Microsoft Azure® model 218*a*, a Google® model 218*b*, and an Amazon® model 218*c*, hosted by Microsoft® servers 216*a*, Google® servers 216*b*, and Amazon® servers 216*c* respectively.

In step 202, the orchestration server 214 receives the request from a client device 220. The request can include the instructions, client data 221, and/or various parameters. The request indicates, for example, the desired operations or outcome and the type of file(s) and/or format of the client data 221, among other operational parameters. Non-limiting examples of the types of client data 221 include image files 221*a*, video files 221*b*, and text files 221*c*, among other types of data.

The orchestration server 214 queries the catalog database 217 of third-party hosted ML models 218 to identify the ML models 218 capable of the desired functions of the client user's request. In some cases, the orchestration server 214 automatically selects the optimal ML models 218 capable of performing the desired functions. In some cases, the orchestration server 214 presents the available and capable ML models 218 to a graphical user interface (GUI) of the client device 220, allowing the client user to select particular ML models 218. The orchestration server 214 also queries the catalog database 217 to identify the ML models 218 capable of handling the particular type of client data 221. For instance, orchestration server 214 receives a text file 221*c* with the request and identifies one or more ML models 218 that can receive and process the text file 221*c*.

Based on the identified and selected ML models 218, the orchestration server 214 establishes the execution pipeline 215, which is a data structure stored in non-transitory machine-readable storage containing data records used by the orchestration server 214 when performing the requested operations. The data records of the execution pipeline 215 indicate the data specifications for the ML models 218, the location to call each ML model 218 (e.g., URI, URL, file directory) at the particular host servers 216.

Continuing with the step 202, the orchestration server 214 formats or normalizes the ingested client data 221 to generate the input data for the first model 218*a* according to the data specification of the first model 218*a*. The orchestration server 214 then transmits the input data to a first host server 216*a* that hosts and executes the first model 218*a*. Additionally or alternatively, the orchestration server 214 transmits the input data to the particular host server 216 based upon various data-transfer requirement or constraints, such as file size or bit stream size, among others. The orchestration server 214 may, for example, transmit the input data in a data stream or as computer file to the host server 216.

The orchestration server 214 references each model 218 in a particular order, as determined automatically based on the desired operations or based on client user inputs or manually according to the instructions received from the client device 220. In some cases, the order of the pipeline 215 organizes the models 218 for sequential execution. In some cases, the order of the pipeline 215 organizes two or more models 218 for parallel execution. In such cases, the orchestration server 214 formats or normalizes the ingested client data 221 as input data for each model 218 (e.g., first model 218*a*, second model 218*b*) ordered for parallel execution. The orchestration server 214 then transmits the respective input data to the corresponding host servers (e.g., first host server 216*a*, second host server 216*b*).

In step 204, the orchestration server 214 receives output data from the first host server 216*a* that executed the first model 218*a*. The output data can be stored into a storage medium to perform any number of additional operations, such as determining and displaying the status of the operations for the user or formatting the output data for further models 218 of the pipeline 215.

In step 206, the orchestration server 214 references the pipeline 215 to identify the next model 218 (e.g., second hosted model 218*b*) for execution and transmits the output data (received in step 204) as the input data to the second host server 216*b*.

In some cases, the host may be the same entity or implement the same data specification across multiple models 218, such that the orchestration server 214 does not need to perform any data reformatting or conditioning. In some cases, the orchestration server 214 formats the output data received from the first host server 216*a* (as in step 204) to generate and transmit the input data ingested by the second host server 216*b* (as in step 206). In such cases, the orchestration server 214 generates the input data according to the data record for the second model 218*b* in the execution pipeline 215, which includes the data specification for the second model 218*b*.

In step 208, the orchestration server 214 receives the output data from the second host server 216*b* that executed the second model 218*b*. The output data can be stored into the storage medium to perform various additional operations, such as determining and displaying the status of the operations for the client user or formatting the output data for further models 218 of the pipeline 215.

In step 210, the orchestration server 214 references the pipeline 215 to identify the next model 218 (e.g., third hosted model 218*c*) for execution, then transmits the output data (received in step 208) as the input data to the third host server 216*c*.

In step 212, the orchestration server 214 receives the output data from the third host server 216*c* that executed the third model 218*c*. The output data can be stored into the storage medium to perform various additional operations for outputting the final result to the client device 220. This may include formatting the final result as computer file or generating a webpage displaying the final output data.

Figure 3:
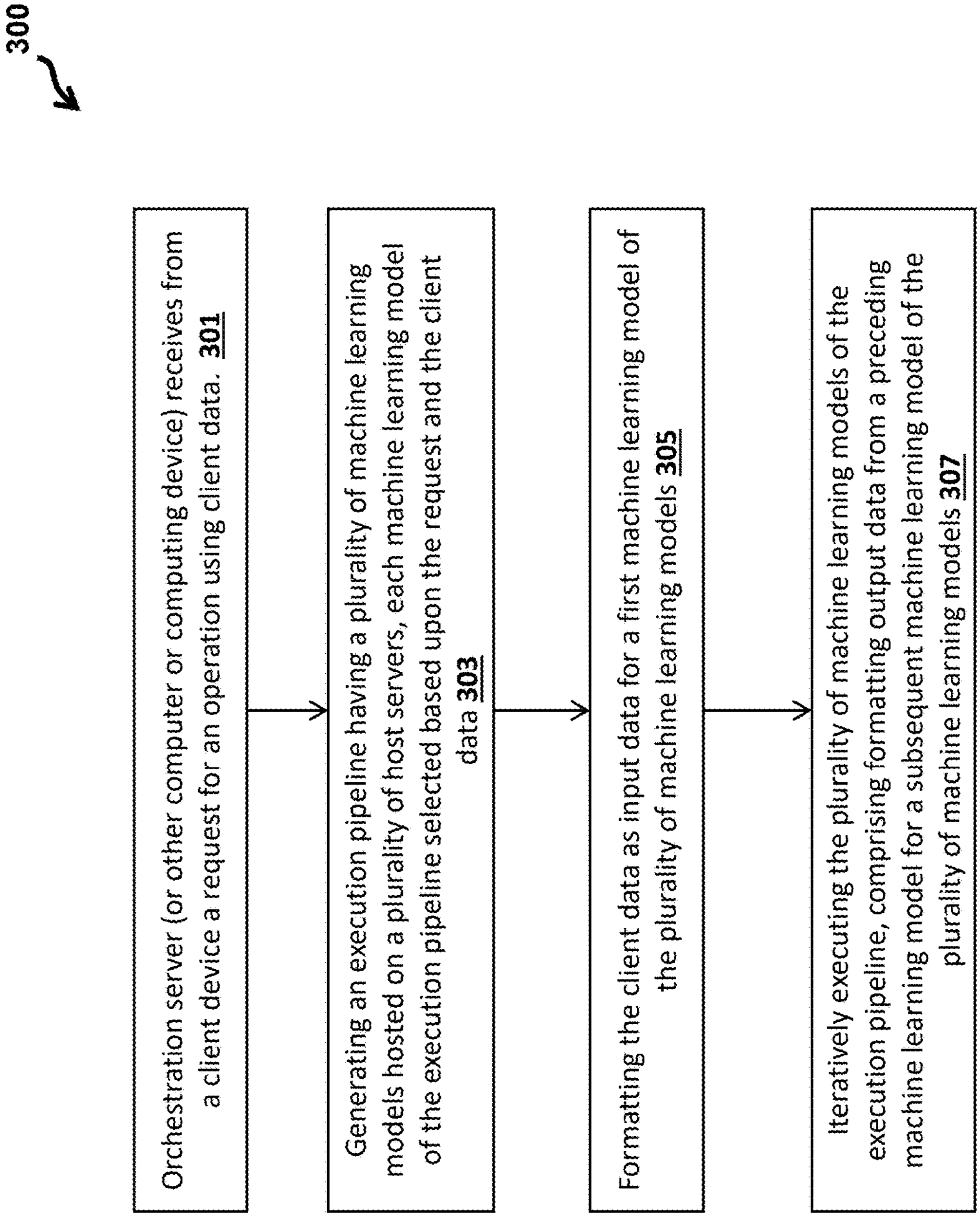
FIG. 3 shows execution operations of a method for developing and an execution pipeline of ML models, according to an embodiment.

FIG. 3 shows execution operations of an example method 300 for developing and an execution pipeline of ML models. The method 300 is described as being performed by an orchestration server, but may be performed by any number of computing devices comprising hardware and software components capable of performing the various tasks and operations described herein.

In step 301, the orchestration server (or other computer or computing device) receives a request from a client device for an operation using client data.

In step 303, the server generates an execution pipeline having a plurality of ML models. The ML models are hosted on one or more host servers, which the server may communicate various types of input and output data via one or more networks. The server may execute a machine-learning architecture defining a pipeline builder trained to select each ML model for the execution pipeline based upon the user's client request. The request indicates, for example, one or more functions that the user would like the pipeline of ML models to perform and the various types of input files of the client data and desired types of output files.

In step 305, the server formats the client data as input data according to format restrictions or requirements of one or more ML models in the execution pipeline.

In step 307, the server iteratively executes the plurality of ML models of the execution pipeline. The server may format the output data from each preceding ML model, which the server then feeds as input data for a subsequent ML model of the plurality of ML models in the execution pipeline.

In some embodiments, a computer-implemented method comprises receiving, by a computer, from a client device a request for an operation using client data; generating, by the computer, an execution pipeline having a plurality of machine learning models hosted on a plurality of host servers, each machine learning model of the execution pipeline selected based upon the request and the client data; formatting, by the computer, the client data as input data for a first machine learning model of the plurality of machine learning models; and iteratively executing, by the computer, the plurality of machine learning models of the execution pipeline, comprising formatting output data from a preceding machine learning model for a subsequent machine learning model of the plurality of machine learning models.

In some implementations, the method further comprises for each iteration of at least one iteration, transmitting, by the computer, the input data to a host server hosting the machine learning model to be executed for the iteration.

In some implementations, the method further comprises identifying, by the computer, a data-transfer requirement for the host server of the machine learning model, wherein the computer transmits the input data to the host server according to the data-transfer requirement.

In some implementations, the method further comprises for each iteration of at least one iteration receiving, by the computer, the output data resulting from the machine learning model of the iteration from a host server hosting the machine learning model.

In some implementations, the method further comprises for each iteration of at least one iteration generating, by the computer, the input data for the machine learning model of the iteration based upon formatting the output data of the preceding machine learning model of a preceding iteration.

In some implementations, the method further comprises identifying, by the computer, a data specification for the machine learning model of a host server, wherein the input data is formatted by the computer for the machine learning model according to the data specification.

In some implementations, the method further comprises identifying, by the computer, a data specification for the machine learning model of a host server; and selecting, by the computer, the machine learning model of the execution pipeline based upon a type of file of the client data received from the client device.

In some implementations, the method further comprises identifying, by the computer, a data specification for the machine learning model of a host of the machine learning model; and selecting, by the computer, the machine learning model of the execution pipeline based upon a type of the output data of a next machine learning model selected for the execution pipeline.

In some implementations, the method further comprises determining, by the computer, an order of execution for the plurality of machine learning models of the execution pipeline based upon the request from the client device.

In some implementations, at least two machine learning models are executed in parallel for a particular iteration using the input data.

In some embodiments, a system comprises one or more catalog databases comprising non-transitory machine-readable storage media configured to store one or more ML models and specification data associated with the ML models and input or output data; and a computer comprising a processor. The computer is configured to receive from a client device a request for an operation using client data; generate an execution pipeline having a plurality of machine learning models hosted on a plurality of host servers, each machine learning model of the execution pipeline selected based upon the request and the client data; format the client data as input data for a first machine learning model of the plurality of machine learning models; and iteratively execute the plurality of machine learning models of the execution pipeline, comprising formatting output data from a preceding machine learning model for a subsequent machine learning model of the plurality of machine learning models.

In some implementations, the computer is further configured to, for each iteration of at least one iteration transmit the input data to a host server hosting the machine learning model to be executed for the iteration.

In some implementations, the computer is further configured to identify a data-transfer requirement for the host server of the machine learning model, wherein the computer transmits the input data to the host server according to the data-transfer requirement.

In some implementations, the computer is further configured to, for each iteration of at least one iteration, receive the output data resulting from the machine learning model of the iteration from a host server hosting the machine learning model.

In some implementations, the computer is further configured to, for each iteration of at least one iteration generate the input data for the machine learning model of the iteration based upon formatting the output data of the preceding machine learning model of a preceding iteration.

In some implementations, the computer is further configured to identify a data specification for the machine learning model of a host server, wherein the input data is formatted by the computer for the machine learning model according to the data specification.

In some implementations, the computer is further configured to identify a data specification for the machine learning model of a host server; and select the machine learning model of the execution pipeline based upon a type of file of the client data received from the client device.

In some implementations, the computer is further configured to identify a data specification for the machine learning model of a host of the machine learning model; and select the machine learning model of the execution pipeline based upon a type of the output data of a next machine learning model selected for the execution pipeline.

In some implementations, the computer is further configured to determine an order of execution for the plurality of machine learning models of the execution pipeline based upon the request from the client device.

In some implementations, at least two machine learning models are executed in parallel for a particular iteration using the input data.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method comprising:

receiving, by a computer, from a client device a request for an operation using client data;

selecting, by the computer, from a catalog of machine learning models stored in an orchestration database, a plurality of machine learning models based upon the operation of the request, the catalog indicating a set of one or more features corresponding to the operation for each machine learning model of the catalog;

generating, by the computer, an execution pipeline having a plurality of data records corresponding to the plurality of machine learning models hosted on a plurality of host servers, each data record indicating a data specification corresponding to a machine learning model and a resource locator for a host server hosting the machine learning model;

formatting, by the computer, the client data as input data for a first machine learning model of the plurality of machine learning models according to the data specification of the first machine learning model indicated by the execution pipeline; and iteratively executing, by the computer, the plurality of machine learning models of the execution pipeline, comprising formatting output data received from the host server hosting a preceding machine learning model as the input data for a subsequent machine learning model of the plurality of machine learning models, and transmitting the input data to the host server hosting the subsequent machine learning model according to the resource locator indicated by the execution pipeline.

2. The method according to claim 1, wherein the computer iteratively executes the execution pipeline for a plurality of iterations, and wherein the method further comprises, for each iteration of at least one iteration:

transmitting, by the computer, the input data to the host server hosting the machine learning model to be executed for the iteration.

3. The method according to claim 2, further comprising:

identifying, by the computer, a data-transfer requirement for the host server of the machine learning model, wherein the computer transmits the input data to the host server according to the data-transfer requirement.

4. The method according to claim 1, for each iteration of at least one iteration:

receiving, by the computer, the output data resulting from the machine learning model of the iteration from a host server hosting the machine learning model.

5. The method according to claim 1, for each iteration of at least one iteration:

generating, by the computer, the input data for the machine learning model of the iteration based upon formatting the output data of the preceding machine learning model of a preceding iteration.

6. The method according to claim 1, further comprising:

identifying, by the computer, a data specification for the machine learning model of a host server, wherein the input data is formatted by the computer for the machine learning model according to the data specification.

7. The method according to claim 1, further comprising:

identifying, by the computer, a data specification for the machine learning model of a host server; and selecting, by the computer, the machine learning model of the execution pipeline based upon a type of file of the client data received from the client device.

8. The method according to claim 1, further comprising:

identifying, by the computer, a data specification for the machine learning model of a host of the machine learning model; and selecting, by the computer, the machine learning model of the execution pipeline based upon a type of the output data of a next machine learning model selected for the execution pipeline.

9. The method according to claim 1, further comprising:

determining, by the computer, an order of execution for the plurality of machine learning models of the execution pipeline based upon the request from the client device.

10. The method according to claim 1, wherein at least two machine learning models are executed in parallel for a particular iteration using the input data.

11. A system comprising:

a computer comprising a processor configured to:

receive from a client device a request for an operation using client data;

select, from a catalog of machine learning models stored in an orchestration database, a plurality of machine learning models based upon the operation of the request, the catalog indicating a set of one or more features corresponding to the operation for each machine learning model of the catalog;

generate an execution pipeline having a plurality of data records corresponding to the plurality of machine learning models hosted on a plurality of host servers, each data record indicating a data specification corresponding to a machine learning model and a resource locator for a host server hosting the machine learning model;

format the client data as input data for a first machine learning model of the plurality of machine learning models according to the data specification of the first machine learning model indicated by the execution pipeline; and iteratively execute the plurality of machine learning models of the execution pipeline, comprising formatting output data received from the host server hosting a preceding machine learning model as the input data for a subsequent machine learning model of the plurality of machine learning models, and transmitting the input data to the host server hosting the subsequent machine learning model according to the resource locator indicated by the execution pipeline.

12. The system according to claim 11, wherein the computer iteratively executes the execution pipeline for a plurality of iterations, and wherein the computer is further configured to, for each iteration of at least one iteration:

transmit the input data to the host server hosting the machine learning model to be executed for the iteration.

13. The system according to claim 12, wherein the computer is further configured to identify a data-transfer requirement for the host server of the machine learning model, wherein the computer transmits the input data to the host server according to the data-transfer requirement.

14. The system according to claim 11, wherein the computer is further configured to, for each iteration of at least one iteration:

receive the output data resulting from the machine learning model of the iteration from a host server hosting the machine learning model.

15. The system according to claim 11, wherein the computer is further configured to, for each iteration of at least one iteration:

generate the input data for the machine learning model of the iteration based upon formatting the output data of the preceding machine learning model of a preceding iteration.

16. The system according to claim 11, wherein the computer is further configured to identify a data specification for the machine learning model of a host server, wherein the input data is formatted by the computer for the machine learning model according to the data specification.

17. The system according to claim 11, wherein the computer is further configured to:

identify a data specification for the machine learning model of a host server; and select the machine learning model of the execution pipeline based upon a type of file of the client data received from the client device.

18. The system according to claim 11, wherein the computer is further configured to:

identify a data specification for the machine learning model of a host of the machine learning model; and select the machine learning model of the execution pipeline based upon a type of the output data of a next machine learning model selected for the execution pipeline.

19. The system according to claim 11, wherein the computer is further configured to determine an order of execution for the plurality of machine learning models of the execution pipeline based upon the request from the client device.

20. The system according to claim 11, wherein at least two machine learning models are executed in parallel for a particular iteration using the input data.

* * * * *